US012648890B2

(12) United States Patent
Liu et al.

(10) Patent No.: US 12,648,890 B2
(45) Date of Patent: Jun. 9, 2026

(54) FLEXIBLE ADULT TOY AND CONTROL METHOD THEREOF

(71) Applicant: HYTTO PTE. LTD., Singapore (SG)

(72) Inventors: Dan Liu, Guangzhou (CN); Jilin Qiu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 983 days.

(21) Appl. No.: 17/816,503

(22) Filed: Aug. 1, 2022

(65) Prior Publication Data

US 2024/0033170 A1 Feb. 1, 2024

(51) Int. Cl.
*A61H 19/00* (2006.01)

(52) U.S. Cl.
CPC ..... *A61H 19/40* (2013.01); *A61H 2201/1215* (2013.01); *A61H 2201/123* (2013.01); *A61H 2201/149* (2013.01); *A61H 2201/1669* (2013.01); *A61H 2201/1671* (2013.01); *A61H 2201/5002* (2013.01); *A61H 2201/5012* (2013.01); *A61H 2201/5097* (2013.01)

(58) Field of Classification Search
CPC .................... A61H 19/40–44; A61H 2201/149
See application file for complete search history.

(56) References Cited

U.S. PATENT DOCUMENTS

2016/0045392 A1 2/2016 Massey

*Primary Examiner* — Thaddeus B Cox
(74) *Attorney, Agent, or Firm* — Qinghong Xu

(57) ABSTRACT

Disclosed is a flexible adult toy including a first body and a second body connected by via a first connecting part, the flexible adult toy includes a first linear driver configured to generate a reciprocal linear movement according to a controller, and the reciprocal linear movement is converted into rotatory movement of the second body by the first connecting part. The flexible adult toy further includes stimulating structure connected to an end of the second body and controlled by the controller.

17 Claims, 7 Drawing Sheets

FLEXIBLE ADULT TOY AND CONTROL METHOD THEREOF

TECHNICAL FIELD

The present disclosure relates to the field of adult toy, and in particular, to an adult toy having flexible structure and a method for controlling the flexible adult toy.

BACKGROUND

Masturbation is generally referred to as a natural and safe way to explore one's body i.e. stimulation of genital organs to obtain sexual pleasure. People use adult toys for exploring one's body (irrespective of gender) to attain sexual pleasure. Adult toys are objects or devices that are primarily used to facilitate human sexual pleasure and typically to date have been designed to resemble human genitals for providing sexual pleasure to users, albeit perhaps in an abstracted form at times.

Due to individual differences, the users often require adult toys to have different degrees of curvature for optimal stimulation. Therefore, manufacturers are providing adult toys with different degrees of curvature and/or shapes to meet the diverse needs.

It should be noted that, information disclosed in the above background portion is provided only for better understanding of the background of the present disclosure, and thus it may contain information that does not form the prior art known by those ordinary skilled in the art.

SUMMARY

The present disclosure provides a flexible adult toy and a method for controlling the same.

According to one aspect, the present disclosure provides a flexible adult toy including a first body; a first linear driver mounted in the first body and having a first pushing rod; a second body including one or more sub bodies connected in sequence, the one or more sub bodies including a first sub body connected to the first body via a first connecting part; a controller configured to control an operation of the first linear driver to generate a reciprocal linear movement of the first pushing rod; and a stimulating structure connected to an end of the second body, wherein the stimulating structure is moveable according to the rotary movement of the second body, and wherein the controller is further configured to control the stimulating structure, wherein the pushing rod is connected to the first connecting part, and the reciprocal linear movement of the first pushing rod is transferred to the second body by the first connecting part to cause a rotary movement of the second body.

According to some embodiments, the rotary movement of the second body includes rotating the second body to a predetermined orientation.

According to some embodiments, the rotary movement of the second body comprises coordinated rotating of the one or more sub bodies.

According to some embodiments, the first connecting part is fixedly connected to the first sub body, and the first connecting part includes a first pivot mount connected to the first pushing rod and a second pivot mount connected to the first body, wherein the second pivot mount is offset from an axis of the reciprocal linear movement of the first pushing rod.

According to some embodiments, the first linear driver includes: a motor configured to drive a screw to rotate clockwise or anti-clockwise; a moving tube, engaged to the screw and configured to move along the screw when the screw is rotated, wherein the moving tube is connected to the first pushing rod to cause the reciprocal linear movement of the first pushing rod when the moving tube is moved along the screw.

According to some embodiments, the controller is configured to receive a control signal of a control device and control the operation of the first linear driver according to the control signal.

According to some embodiments, the controller includes a wireless communication module configured to receive the control signal from the control device.

According to some embodiments, the wireless communication module is a WiFi module or a Bluetooth module.

According to some embodiments, the controller includes a control button to control the operation of the first linear driver and the stimulating structure.

According to some embodiments, the flexible adult toy further includes a sensor configured to detect the reciprocal linear movement of the first pushing rod, and wherein the controller is further configured to control the operation of the first linear driver according to detecting information of the sensor.

According to some embodiments, the one or more sub bodies include an n-th sub body and an (n+1)-th sub body adjacent to each other, and the flexible adult toy further includes a second linear driver mounted in the n-th sub body and having a second pushing rod, wherein the (n+1)-th sub body is connected to the n-th sub body via a second connecting part, wherein the controller is further configured to control an operation of the second linear driver to generate a reciprocal linear movement of the second pushing rod, and wherein the second pushing rod is connected to the second connecting part, and the reciprocal linear movement of the second pushing rod is transferred to the (n+1)-th sub body by the second connecting part to cause a rotary movement of the (n+1)-th sub body.

According to some embodiments, the one or more sub bodies include an n-th sub body and an (n+1)-th sub body adjacent to each other, and wherein the n-th sub body is connected to the (n+1)-th sub body via a fixed connecting part.

According to some embodiments, the one or more sub bodies include an n-th sub body and an (n+1)-th sub body adjacent to each other, and wherein the flexible adult toy further includes a rotary driving part fixedly connected to the n-th sub body and including a rotatable part that is rotatable around an axis along an extending direction of the adult toy, wherein the (n+1)-th sub body is connected to the rotatable part of the rotary driving part, wherein the controller is further configured to control an operation of the rotary driving part to generate a rotary movement of the (n+1)-th sub body.

According to some embodiments, the first linear driver includes at least one of a rotating motor and a linear motor.

According to some embodiments, the stimulating structure includes at least one of a vibrating module, a swelling module, a sucking module, a rotating module and a heating module.

According to another aspect, the present disclosure further provides a method for controlling the above flexible adult toy, including: receiving, by a first terminal, a control request of the flexible adult toy from a second terminal; activating a communication between the first terminal and the flexible adult toy according to the control request, and sending, by the first terminal, a response to the control request to the second terminal; receiving, by the first terminal, a control instruction from the second terminal; and sending, by the first terminal, the control instruction to the flexible adult toy via the wireless communication, to control an operation of the flexible adult toy according to the control signal.

According to some embodiments, a communication between the first terminal and the second terminal is established by an instant-messaging application or web browser.

According to some embodiments, communication between the first terminal and the flexible adult toy includes at least one of WIFI communication and Bluetooth communication.

According to some embodiments, the method further includes: detecting, by a sensor disposed in the flexible adult toy, status of the flexible adult toy; and sending detected information to the first terminal.

According to some embodiments, the method further includes: generating, by the first terminal, a simulation image of the flexible adult toy according to the detected information; and sending the simulation image to the second terminal.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings are enclosed to provide a further understanding of the present disclosure and constitute a part of the specification, and together with the following detailed description, to serve for explanation of the present disclosure. But the accompanying drawings are not to be construed as limiting the present disclosure. In the drawings.

In order to more clearly illustrate the technical solutions of the embodiments of the present disclosure, drawings of the embodiments of the present disclosure will be briefly described below. It will be apparent that the drawings in the following description refer only to some embodiments of the present disclosure, and are not intended to limit the present disclosure.

DETAILED DESCRIPTION

Figure 1:
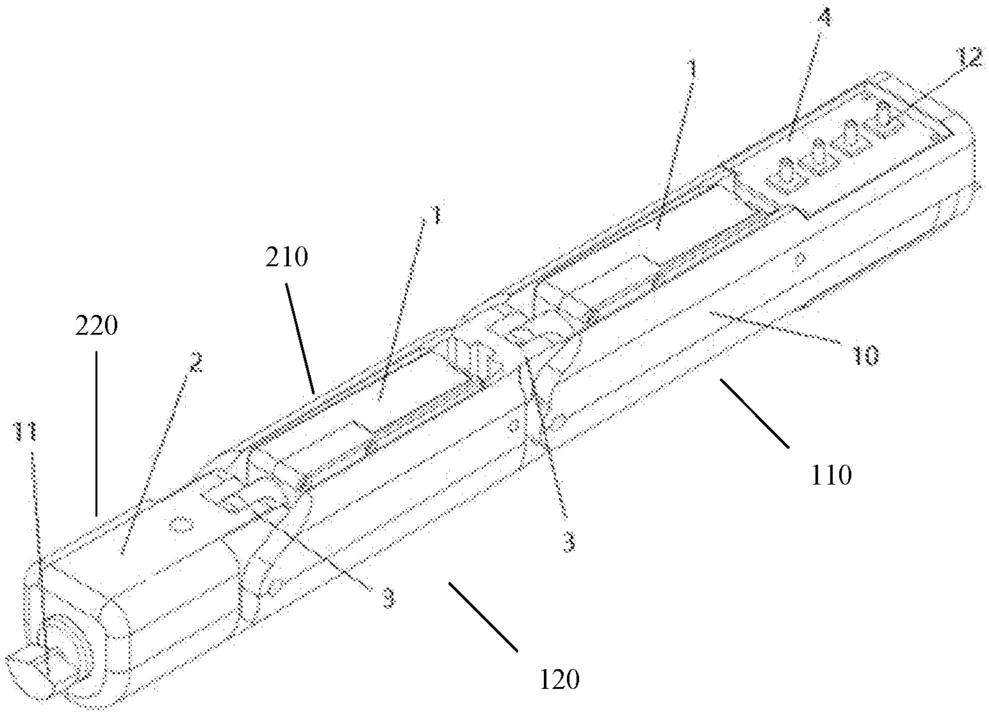
FIG. 1 illustrates a schematic structure diagram of the flexible adult toy according an embodiment of the present disclosure.

Hereinafter, the flexible adult toy according to the present disclosure will be described in further detail with reference to the accompanying drawings and particular embodiments of the present disclosure, such that those skilled in the art may have a better understanding of technical solutions of the present disclosure.

In order to make the objectives, technical solutions and advantages of the embodiments of the present disclosure more clear, the technical solutions of the embodiments of the present disclosure will be described clearly and completely in conjunction with the accompanying drawings of the embodiments of the present disclosure. It is obvious that the described embodiments are part of the embodiments rather than all embodiments of the present disclosure. All other embodiments obtained by one of ordinary skill in the art based on the described embodiments of the present disclosure without the need for creative work are within the scope of the present disclosure.

In the description of the embodiments of the present disclosure, it is to be noted that the directional or positional relationships indicated by the terms "upper", "lower", "top", "bottom" or the like are based on the directional or positional relationships shown in the drawings, which are provided only for the purpose of facilitating the description and simplification of the description and is not intended or implied that the device or element referred to must have a specific orientation, constructed or operated in a particular orientation. Accordingly, it should not be construed as a limitation of this disclosure.

In addition, in the description of the embodiments of the present disclosure, unless otherwise indicated, the term "a plurality of" means two or more.

Figure 2:
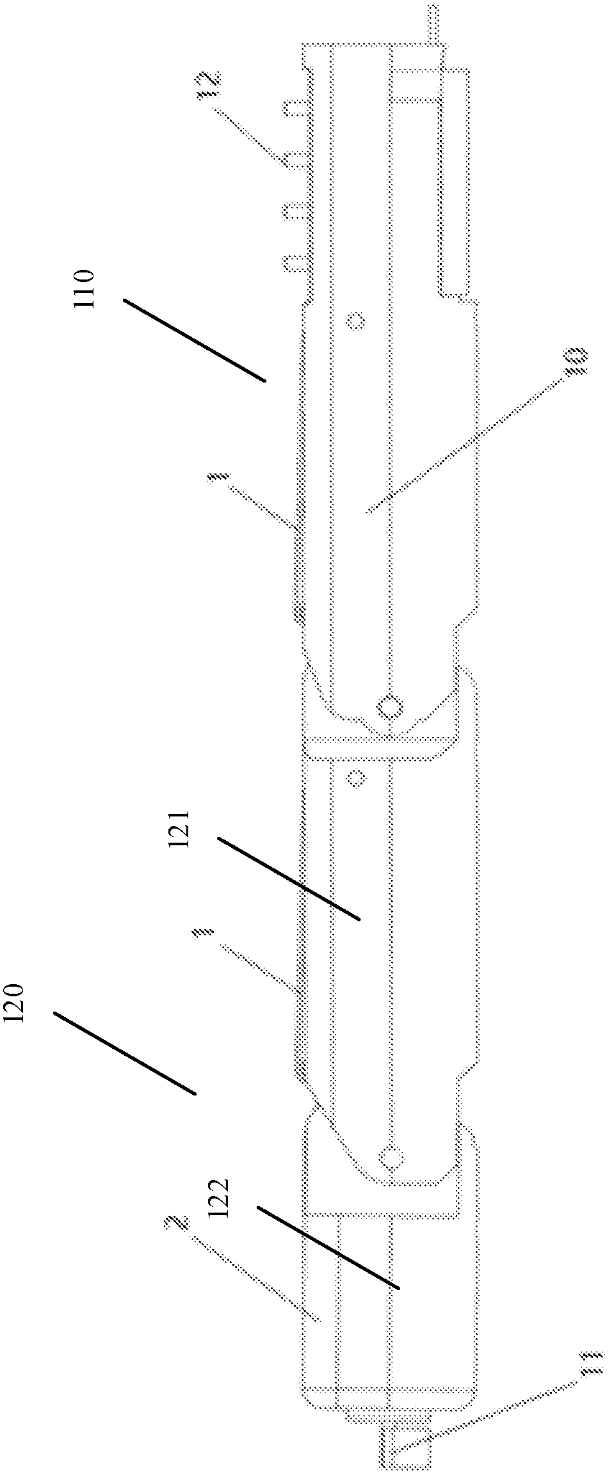
FIG. 2 illustrates a front view of the flexible adult toy according an embodiment of the present disclosure.
Figure 3:
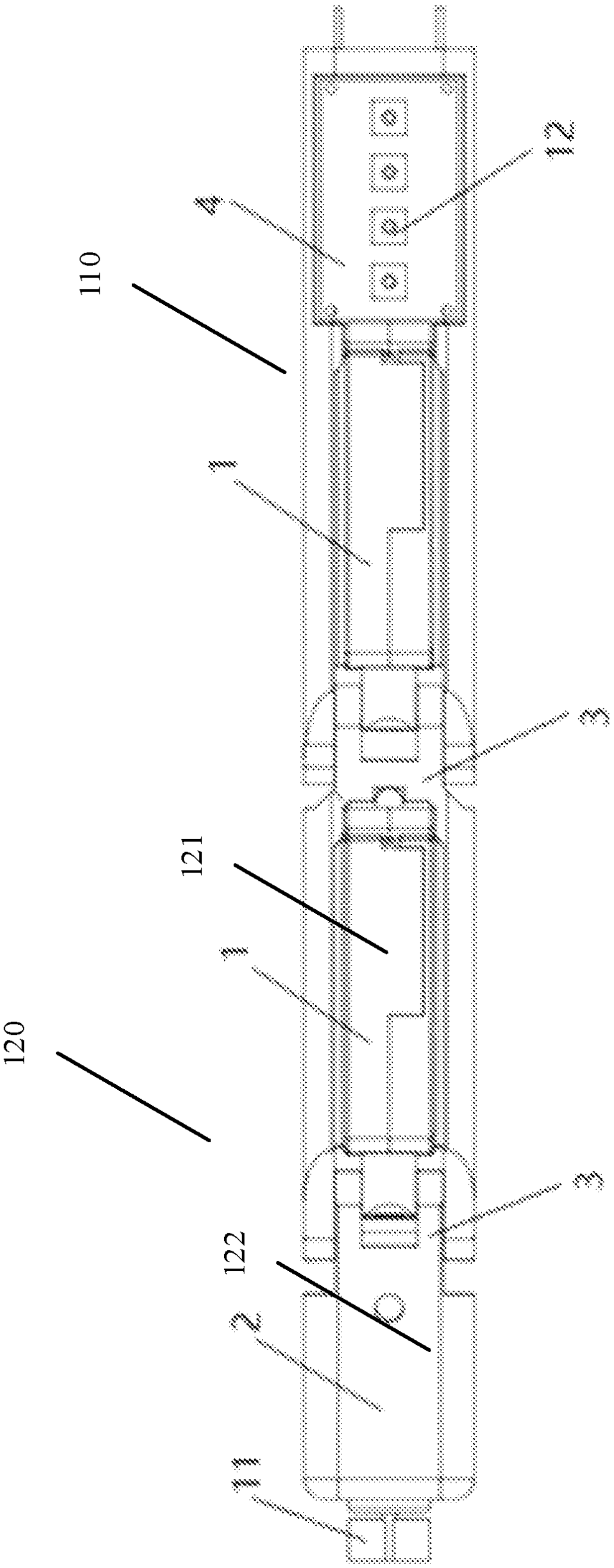
FIG. 3 illustrates a planform of the flexible adult toy according an embodiment of the present disclosure.
Figure 4:
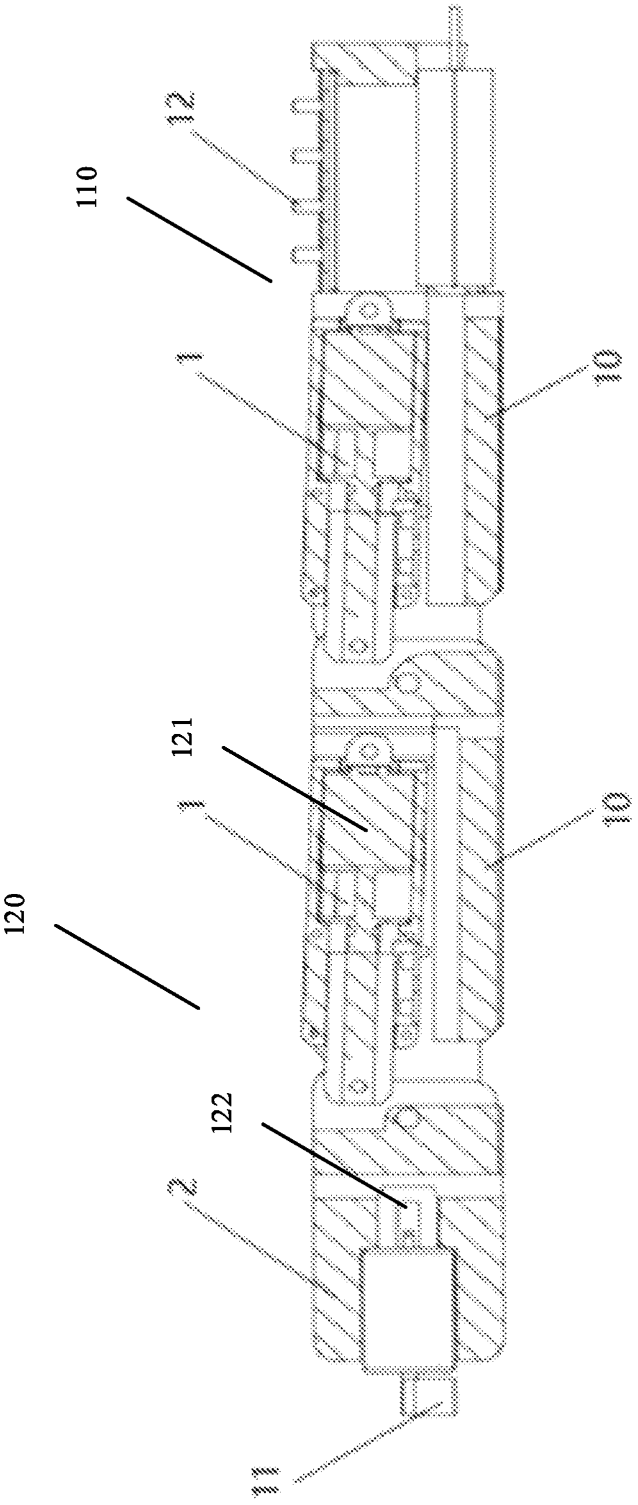
FIG. 4 illustrates a section view of the flexible adult toy according an embodiment of the present disclosure.
Figure 5:
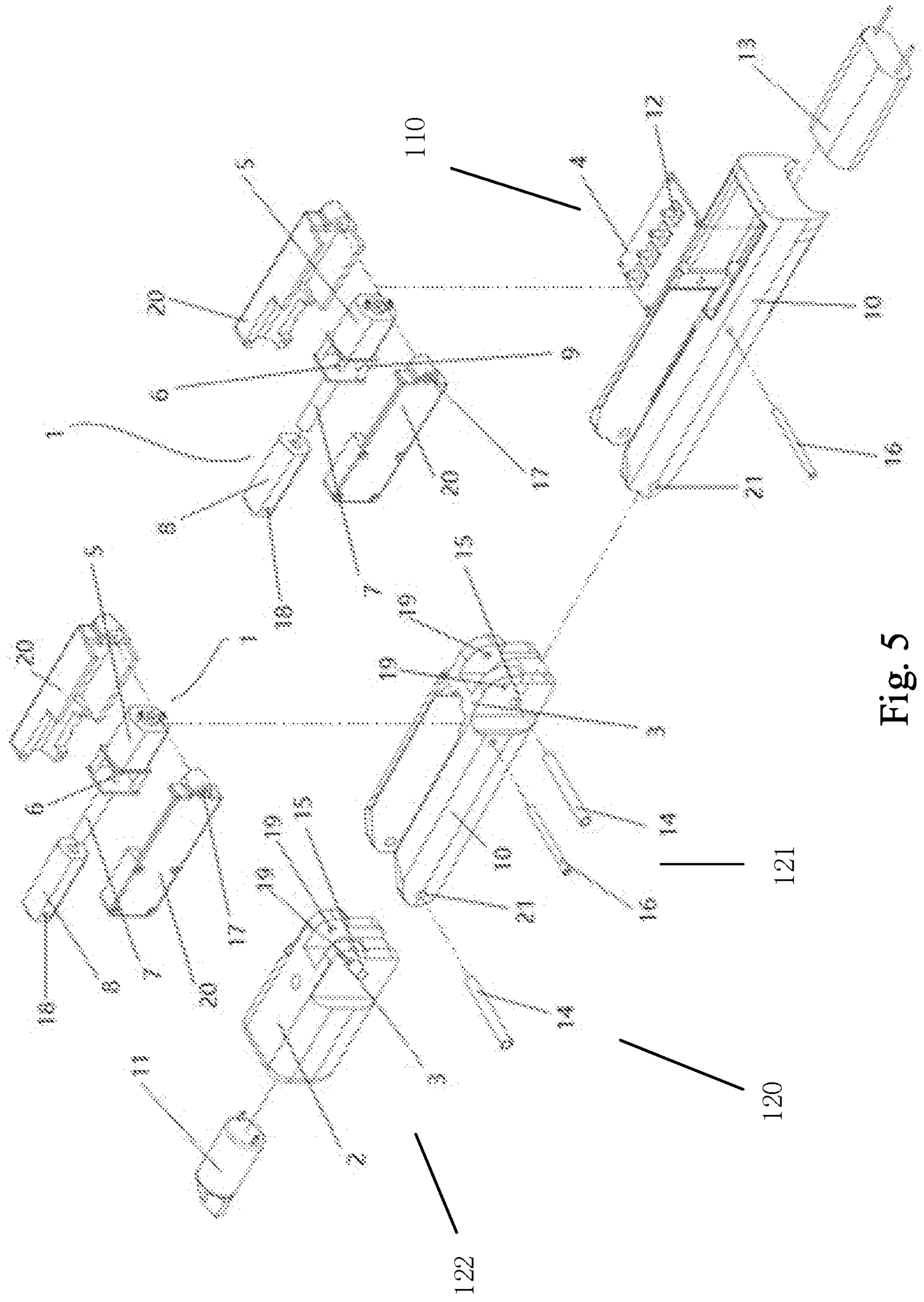
FIG. 5 illustrates an exploded view of the flexible adult toy according an embodiment of the present disclosure.

FIG. 1 illustrates a schematic structure diagram of the flexible adult toy according an embodiment of the present disclosure, FIG. 2 illustrates a front view of the flexible adult toy according an embodiment of the present disclosure; FIG. 3 illustrates a planform of the flexible adult toy according an embodiment of the present disclosure; FIG. 4 illustrates a section view of the flexible adult toy according an embodiment of the present disclosure; and FIG. 5 illustrates an exploded view of the flexible adult toy according an embodiment of the present disclosure. As shown in FIGS. 1-5, the flexible adult toy includes a first body 110; a first linear driver 1 mounted in the first body 110 and having a first pushing rod 8; a second body 120 including one or more sub bodies connected in sequence, the one or more sub bodies including a first sub body 121 connected to the first body 110 via a first connecting part 3; a controller 4 configured to control an operation of the first linear driver 1 to generate a reciprocal linear movement of the first pushing rod 8; and a stimulating structure 11 connected to an end of the second body 120, wherein the stimulating structure 11 is moveable according to the rotary movement of the second body 120, and wherein the controller 4 is further configured to control the stimulating structure 11, wherein the first pushing rod 8 is connected to the first connecting part 3, and the reciprocal linear movement of the first pushing rod 8 is transferred to the second body 120 by the first connecting part 3 to cause a rotary movement of the second body 120. In this embodiment, among the sub bodies of the second body 120, the sub body 2 that is mostly away from the first body 110 may perform a swing-like motion according to the movement of the first and second bodies, and thus it can also be referred as a swing part 2.

In the present embodiment, when the first linear driver 1 is running, the reciprocal linear motion of the first pushing rod 8 is converted into a rotary movement of the second body 120 via the connecting part 3. In the embodiment shown in FIG. 1, when the first pushing rod 8 of first linear driver 1 extends forward towards the second body 120, the second body 120 is caused to rotate in a first direction (e.g., anticlockwise) about the connecting part 3, and when the first pushing rod 8 of first linear driver 1 retracts back, the second body 120 is caused to rotate in a second direction (e.g., clockwise) about the connecting part 3. Accordingly, the reciprocating extension and retraction of the first pushing rod 8 may cause the second body 120 to swing back and forth within a predetermined angle range. Moreover, when the first pushing rod 8 of first linear driver 1 extends or retracts to a particular position and then stops at the position, the second body 120 will rotate to a predetermined orientation, and remains in that orientation.

In some embodiments, when a user is using the flexible adult toy, one end of the flexible adult toy, e.g., the remote end of the second body 120, can be inserted into the user's body, and the end can be rotated by the first linear driver 1. Therefore, with the operation of the stimulating structure 11, the flexible adult toy may provide stimulating to the user at various orientations. Moreover, according to some embodiments, the second body 120 can be rotated to a predetermined orientation, and remains in that orientation, such that stimulating to a particular spot of the user can be provided by the stimulating structure 11 of the flexible adult toy.

As shown in FIGS. 1-5, the second body 120 includes the first sub body 121 and a second sub body 122 connected in sequence via a connecting part 3, and a second linear driver 1 is mounted in the first sub body 121. The connecting part 3 between the first sub body 121 and the second sub body 122 may be configured to have similar structure as the connecting part 3 between the first body 110 and the first sub body 121, and therefore the same reference numeral is used for these connecting parts. Also, the second linear driver 1 may be configured to have similar structure as the first linear driver 1 mounted in the first body 110, and therefore the same reference numeral is used for these connecting parts. It should be noted that the above embodiments are provided for illustration, and different connecting parts or different linear drivers may be provided within the teaching of the present disclosure.

In the present embodiment, when the second linear driver 1 is running, the reciprocal linear motion of the first pushing rod 8 is converted into a rotary movement of the second sub body 122 via the connecting part 3. In the embodiment shown in FIG. 1, when the first pushing rod 8 of second linear driver 1 extends forward towards the second sub body 122, the second sub body 122 is caused to rotate in a first direction (e.g., anticlockwise) about the connecting part 3, and when the first pushing rod 8 of second linear driver 1 retracts back, the second sub body 122 is caused to rotate in a second direction (e.g., clockwise) about the connecting part 3. Moreover, when the first pushing rod 8 of second linear driver 1 extends or retracts to a particular position and then stops at the position, the second sub body 122 will rotate to a predetermined orientation, and remains in that orientation. Accordingly, with the rotation of both the first sub body 121 and the second sub body 122, the second body 120 can be more flexible and will be able to rotate to more orientations, and thus the stimulating can be applied to a larger area and/or more spots.

According to an embodiment, the first and second linear drivers 1 are controlled by the controller 4. In particular, the first and second linear drivers 1 may be controlled independently to form a particular shape of the adult toy. Also, in one embodiment, the first and second linear drivers 1 may be associated such that the first sub body 121 and the second sub body 122 may perform coordinated rotating according to the controller 4.

For example, the flexible adult toy may further include a sensor (not shown in the drawings) configured to detect the reciprocal linear movement of the first pushing rod 8, and the controller 4 may be further configured to control the operation of the first linear driver 1 according to detecting information of the sensor. For example, with the sensor, the linear movement of the first pushing rod 8 can be detected and thus the bending angle of the flexible adult toy can be determined, therefore, the controller 4 can further control the first liner driver 1 to move the first pushing rod 8 forward to increase the bending angle or backward to reduce the bending angle. In particular, although not shown in the drawings, those of ordinary skill in the art will realize that the sensor can be disposed close to the first pushing rod 8 to detect the reciprocal linear movement thereof. The sensor can be any sensor capable of sensing movement, such as a Hall sensor based on magnetic sensing.

In this embodiment, the sensor detects the reciprocal linear movement of the first pushing rod 8, determines the position of the first pushing rod 8. The bending angle of the second body (in particular the first sub body 121) can be determined according to the position of the first pushing rod 8. The sensed information can be provided to the controller 4, and the controller 4 further controls the second liner driver 1 according to the information, to drive the second pushing rod 8 of the second linear driver 1 to move to a certain position. Therefore, the second sub body 122 can bend to a particular angle relative to the first sub body 121 adaptable to the bending angle of the first sub body 121 relative to the first body 110. Accordingly, coordinated rotating of the sub bodies of the second body 120 can be achieved.

In the embodiment, referring to FIG. 5, the first connecting part 3 is fixedly connected to the first sub body 121, and the first connecting part 3 includes a first pivot mount connected to the first pushing rod 8 and a second pivot mount connected to the first body 110, wherein the second pivot mount is offset from an axis of the reciprocal linear movement of the first pushing rod 8.

In this embodiment, the first body 110 includes a housing 10, a fixing member 20 and a pin 16. A through hole 17 is disposed on the fixing member 20, and the first linear driver 1 is fixed to the housing 10 by the through hole 17 of the fixing member 20 and the pin 16, such that the first linear driver 1 is fixed in the housing 10.

The first pivot mount may include a through hole 18 disposed on the first pushing rod 8 of the first linear driver 1, a through hole 19 disposed on the first connecting part 3 corresponding to the through hole 18 of the first pushing rod 8 of the first linear driver 1, and a pin (not shown in the drawings) inserted into the through hole 18 and the through hole 19, a relative movement can occur between the through hole 18 of the first pushing rod 8 of the first linear driver 1 and the pin (not shown in the drawings), such that the first pivot mount is formed to connect the first connecting part 3 and the first pushing rod 8. In this embodiment, the through hole 19 may be fixedly connected to the pin.

The second pivot mount may include a through hole 21 disposed on the first body 110, a through hole 15 disposed on the first connecting part 3 corresponding to the through hole 21 of the housing 10, and a pin 14 inserted into the through hole 21 and the through hole 15, a relative movement can occur between the through hole 15 and the pin 14, such that the second pivot mount is formed to connect the first connecting part 3 and the housing 10. In this embodiment, the through hole 21 may be fixedly connected to the pin 14.

In this embodiment, when the first linear driver 1 operates, the first pushing rod 8 of the first linear driver reciprocates linearly in different directions along an axis of the first linear driver 1, and the reciprocating linear movement of the first pushing rod 8 resulting in constantly changing pressure on the pin which connects the first linear driver 1 and the first connecting part 3 of which one end is fixedly connected to the second body 120, thereby resulting in a rotation of the pin. Further, the rotary motion of the pin which connects the first linear driver 1 and the connecting part 3 of which one end is fixedly connected to the second body 120 resulting in the rotary motion of the second body 120.

That is, the linear movement generated by the first linear driver 1 is converted into a rotary movement of the second body 120 via the connecting part 3 (e.g., the pin and the through hole) when the first linear driver 1 is running, such that the flexible adult toy bends according to a set angle.

The second linear driver 1 and the second connecting part 3 may have similar structures as the first linear driver 1 and the first connecting part 3, and correspondingly, the linear movement generated by the second linear driver 1 is converted into a rotary movement of the second sub body 122 via the second connecting part 3 (e.g., the pin and the through hole) when the second linear driver 1 is running, such that the flexible adult toy bends according to a set angle. Detailed description of the second linear driver 1 and the second connecting part 3 will be omitted for brevity, and corresponding details may refer to the corresponding description on the first linear driver 1 and the first connecting part 3.

In the embodiment, the controller 4 may include a control button to control the operation of the adult toy. For example, the control button 12 may be configured to control the operation of the first linear driver 1, the second linear driver 1 and the stimulation structure 11. Also, the control button 12 may be configured to control other functions of the adult toy (e.g., switching different vibration pattern or vibration intensity of the stimulation structure 11).

In the embodiment shown in FIG. 5, the adult toy also includes a power supply 13 disposed in the housing 10, and the power supply 13 is configured to supply power to the first and second linear drivers 1, the stimulating structure 11 and the controlling part 4.

According to some embodiment, the flexible adult toy can further comprise an outer skin (not shown in the drawings) accumulating the first body, the second boy, the controller, and/or other components of the flexible adult toy. The outer skin may be made of flexible silicone, and by providing the outer skin, the flexible adult toy can have an integrated appearance. Also, the flexible silicone is soft and safe, and thus can improve the user experience. Moreover, skin friendly materials other than the flexible silicone can also be used without limitation.

Figure 6:
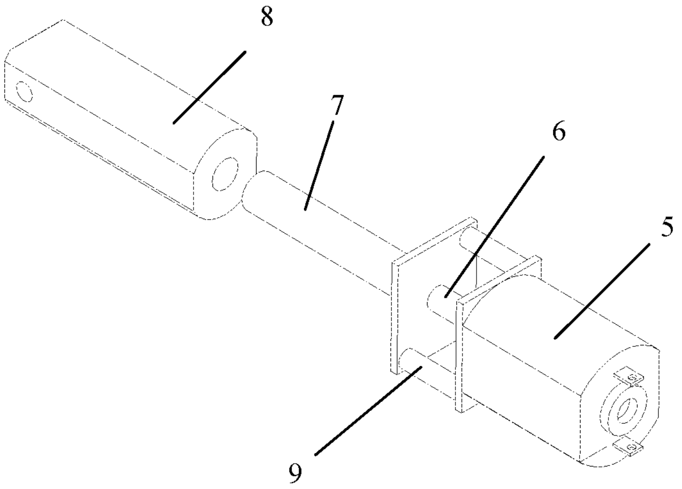
FIG. 6 illustrates a structure diagram of the linear driver of the flexible adult toy according an embodiment of the present disclosure.

FIG. 6 illustrates a structure diagram of the linear driver of the flexible adult toy according an embodiment of the present disclosure. Referring to FIG. 6, the first linear driver 1 may include: a motor 5 configured to drive a screw 6 to rotate clockwise or anti-clockwise; a moving tube 7, engaged to the screw 6 and configured to move along the screw 6 when the screw 6 is rotated, wherein the moving tube 7 is connected to the first pushing rod 8 to cause the reciprocal linear movement of the first pushing rod 8 when the moving tube 7 is moved along the screw. According to the embodiment, the first linear driver 1 may further include a speed reducer 9 to adjust the rotation speed and the torque of the screw 6. In this embodiment, the motor 5 may be a rotating motor having an output shaft connected to the screw 6 via the speed reducer 9, to drive the screw 6 to rotate clockwise or anti-clockwise. In another embodiment, the linear driver 1 may also include a linear motor to drive the first pushing rod 8 to cause the reciprocal linear movement of the first pushing rod 8.

The motor 5 may be disposed in a motor box, and may be connected to the screw 6 to drive the screw 6 to rotate. The moving tube 7 is disposed on the screw 6. Threads (not shown in the drawings) are disposed on the screw 6, and the inner side of the moving tube 7 facing the screw 6 includes threads engaged to the threads (not shown in the drawings) of the screw 6. Accordingly, when the screw 6 reciprocates in different directions, the moving tube 7 reciprocates linearly in different directions along the screw 6. The first pushing rod 8 is disposed on the moving tube 7, when the moving tube 7 performs reciprocating linearly motion, the moving tube 7 drives the first pushing rod 8 to reciprocate linearly.

In the above embodiment shown in FIGS. 1-5, an example in which the second body 120 includes two sub bodies (i.e., the first sub body 121 and the second sub body 122) are described. However, the present disclosure is not limited thereto, the second body 120 may include only one sub body, or three or more sub bodies.

The sub bodies may be connected in sequence, and adjacent sub bodies may be connected by a connecting part similar to the first and second connecting parts 3 discussed above, and may be driven by a driver similar to the first and second linear driver 1 discussed above, such that the sub bodies may perform coordinated rotating or independent rotating. Also, some adjacent parts may be connected by a fixed connecting part, such that the sub bodies may rotate together. Moreover, some adjacent bodies may be connected by a rotary driving part, such that one of the adjacent bodies may be rotatable around an axis along an extending direction of the adult toy.

Figure 7:
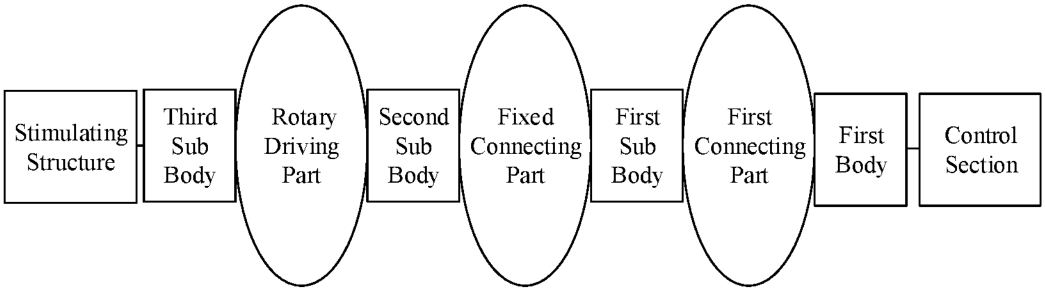
FIG. 7 illustrates a schematic block diagram of the flexible adult toy according to an example of the present disclosure.

FIG. 7 illustrates a schematic block diagram of the flexible adult toy according to an example of the present disclosure.

Referring to FIG. 7, the first body may be separated from or fixedly connected to the control section, or first body and the control section may be integrated. A power supply may be provided in the control section or the first body to provide power to the adult toy.

In one embodiment, when the first body is separated from the control section, the controller 4 as discussed above may be configured to receive a control signal from the control section, and control the operation of the first linear driver according to the control signal. Also, in this case, the controller 4 may include a wireless communication module configured to receive the control signal from the control section. In a non-limiting example, the wireless communication module may be a WiFi module or a Bluetooth module.

The first body and the first sub body of the second body is connected by the first connecting part, and the first linear driver is disposed in the first body. These elements have been discussed in detail in the above embodiments, and corresponding description will be omitted.

The second body have two adjacent sub bodies, i.e., the first sub body and the second sub body, connected by a fixed connecting part, such that the second sub body rotates along with the first sub body.

The second body also have two adjacent sub bodies i.e., the second sub body and the third sub body, connected by a rotary driving part, such that the third sub body may be rotatable around an axis along an extending direction of the adult toy. The stimulating structure 11 is connected to the third sub body, and therefore is rotatable along with the third sub body around an axis along an extending direction of the adult toy. Moreover, although two sub bodies are described in these embodiment, it should be noted that the number of the sub bodies are not limited by two. For example, more sub bodies can be provided an in which the n-th sub body and (n+1) sub body among these sub bodies can be arranged to have the structure discussed with reference to the second sub body and the third sub body. When the number of sub bodies increases, the length of the flexible adult toy can be increased, and moreover the bending angle of the flexible adult toy can also be increased.

According to an embodiment of the present disclosure, the stimulating structure 11 may include stimulating structure includes at least one of a vibrating module, a swelling module, a sucking module, a rotating module and a heating module. When the stimulating structure 11 is moving along with the second body 120, the stimulating structure 11 may be placed at the desired position and apply pressure and/or friction to the human body, also, the stimulating structure 11 may also apply stimulation such as vibrating, swelling pressure, sucking, rotating friction and heat to the human body with the above modules. Other stimulating structures are also applicable according to the teaches of the present disclosure. The operation of the stimulation structure 11, e.g., action pattern or operating intensity, may be controlled by the control button 12. For example, by pressing the control button 12, the stimulation structure 11 may switch from one vibration pattern to another one, or may switching from vibration action to rotating action, or other action patterns. In some embodiments, the operating of the stimulation structure 11 may be controlled by the control button 12 independently from the swing movement of the second body 120.

Figure 8:
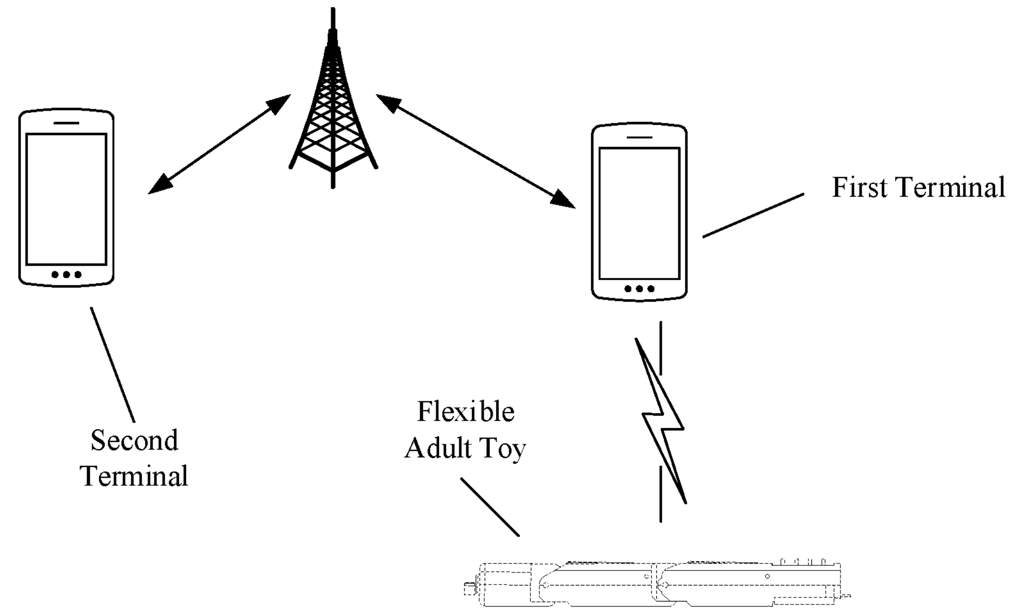
FIG. 8 illustrates a scenario of a method for controlling the flexible adult toy according to an example of the present disclosure.

FIG. 8 illustrates a scenario of a method for controlling the flexible adult toy according to an example of the present disclosure.

As shown in FIG. 8, the scenario of a method for controlling the flexible adult toy includes a first terminal, a second terminal and the flexible adult toy. The first terminal local to the flexible adult toy and is configured to send control signals to the controller 4 of the flexible adult toy. The second terminal is remote to the flexible adult toy, and the second terminal may communicate with the first terminal by a LAN or WLAN network, or any other local network or global network.

In this embodiment, the method for controlling the flexible adult toy may include: receiving, by a first terminal, a control request of the flexible adult toy from a second terminal; activating a communication between the first terminal and the flexible adult toy according to the control request, and sending, by the first terminal, a response to the control request to the second terminal; receiving, by the first terminal, a control instruction from the second terminal; and sending, by the first terminal, the control instruction to the flexible adult toy via the wireless communication, to control an operation of the flexible adult toy according to the control signal.

According to this embodiment, the remote terminal may communicate with the local terminal and send control request of the flexible adult toy, and in response to the control request, the local terminal activates a local communication to the flexible adult toy. When the local communication is established, the local terminal sends a response message to the remote terminal, such that the remote terminal is allowed to send control instructions to control the flexible adult toy. The local terminal may then forward the control instructions to the flexible adult toy to control an operation of the flexible adult toy. In this way, the user is able to control the flexible adult toy remotely, thereby improving the fun and interactivity of the flexible adult toy.

As discussed above, the second terminal may communicate with the first terminal by a LAN or WLAN network, or any other local network or global network, and in this embodiment, the communication between the first terminal and the second terminal is established by an instant-messaging application or web browser. Also, the communication between the first terminal and the flexible adult toy may be wireless communication, such as at least one of WIFI communication and Bluetooth communication.

In the present embodiment, the controller 4 may also send the information detected by the sensor to the first terminal. Accordingly, the first terminal may learn the movement information of the first pushing rod 8, so that the status of the toy can be determined according to the detected information, and a simulation image of the flexible adult toy can be generated according to the information. Moreover, the first terminal is also configured to send such information to the second terminal, to allow the second terminal to display the simulation image of the flexible adult toy, thereby further improving the fun and interactivity of the flexible adult toy.

It should be appreciated that, the above embodiments are exemplary implementations for illustrating the principle of the present disclosure only, while the present disclosure is not limited thereto. Various modifications and improvements are possible to those of ordinary skill in the art without departing from the spirit and essence of the present disclosure. All these modifications and improvements will also fall into the protection scope of the present disclosure.

What is claimed is:

1. A method for controlling a flexible adult toy comprising:

a first body;

a first linear driver mounted in the first body and having a first pushing rod;

a second body comprising one or more sub bodies connected in sequence, the one or more sub bodies comprising a first sub body connected to the first body via a first connecting part;

a controller configured to control an operation of the first linear driver to generate a reciprocal linear movement of the first pushing rod; and a stimulating structure connected to an end of the second body, wherein the controller is further configured to control the stimulating structure, wherein the first pushing rod is connected to the first connecting part, and the reciprocal linear movement of the first pushing rod is transferred to the second body by the first connecting part to cause a rotary movement of the second body; and wherein the stimulating structure is moveable according to the rotary movement of the second body;

wherein the method comprises:

receiving, by a first terminal, a control request of the flexible adult toy from a second terminal;

activating a communication between the first terminal and the flexible adult toy according to the control request, and sending, by the first terminal, a response to the control request to the second terminal;

receiving, by the first terminal, a control instruction from the second terminal; and sending, by the first terminal, the control instruction to the flexible adult toy via wireless communication, to control an operation of the flexible adult toy according to the control signal.

2. The method for controlling the flexible adult toy according to claim 1, wherein the rotary movement of the second body comprises rotating the second body to a predetermined orientation.

3. The method for controlling the flexible adult toy according to claim 1, wherein the rotary movement of the second body comprises coordinated rotating of the one or more sub bodies.

4. The method for controlling the flexible adult toy according to claim 1, wherein the first connecting part is fixedly connected to the first sub body, and the first connecting part comprises a first pivot mount connected to the first pushing rod and a second pivot mount connected to the first body, wherein the second pivot mount is offset from an axis of the reciprocal linear movement of the first pushing rod.

5. The method for controlling the flexible adult toy according to claim 1, wherein the first linear driver comprises:

a motor configured to drive a screw to rotate clockwise or anti-clockwise;

a moving tube, engaged to the screw and configured to move along the screw when the screw is rotated, wherein the moving tube is connected to the first pushing rod to cause the reciprocal linear movement of the first pushing rod when the moving tube is moved along the screw.

6. The method for controlling the flexible adult toy according to claim 1, wherein the controller is configured to receive a control signal of a control device and control the operation of the first linear driver according to the control signal.

7. The method for controlling the flexible adult toy according to claim 6, wherein the controller comprises a wireless communication module configured to receive the control signal from the control device.

8. The method for controlling the flexible adult toy according to claim 1, wherein the controller comprises a control button to control the operation of the first linear driver and the stimulating structure.

9. The method for controlling the flexible adult toy according to claim 1, further comprising a sensor configured to detect the reciprocal linear movement of the first pushing rod, and wherein the controller is further configured to control the operation of the first linear driver according to detecting information of the sensor.

10. The method for controlling the flexible adult toy according to claim 1, wherein the one or more sub bodies comprise an n-th sub body and an (n+1)-th sub body adjacent to each other, and the flexible adult toy further comprises a second linear driver mounted in the n-th sub body and having a second pushing rod, wherein the (n+1)-th sub body is connected to the n-th sub body via a second connecting part, wherein the controller is further configured to control an operation of the second linear driver to generate a reciprocal linear movement of the second pushing rod, and wherein the second pushing rod is connected to the second connecting part, and the reciprocal linear movement of the second pushing rod is transferred to the (n+1)-th sub body by the second connecting part to cause a rotary movement of the (n+1)-th sub body.

11. The method for controlling the flexible adult toy according to claim 1, wherein the one or more sub bodies comprise an n-th sub body and an (n+1)-th sub body adjacent to each other, and wherein the n-th sub body is connected to the (n+1)-th sub body via a fixed connecting part.

12. The method for controlling the flexible adult toy according to claim 1, wherein the one or more sub bodies comprise an n-th sub body and an (n+1)-th sub body adjacent to each other, and wherein the flexible adult toy further comprises a rotary driving part fixedly connected to the n-th sub body and comprising a rotatable part that is rotatable around an axis along an extending direction of the flexible adult toy, wherein the (n+1)-th sub body is connected to the rotatable part of the rotary driving part, wherein the controller is further configured to control an operation of the rotary driving part to generate a rotary movement of the (n+1)-th sub body.

13. The method for controlling the flexible adult toy according to claim 1, wherein the first linear driver comprises at least one of a rotating motor and a linear motor.

14. The method for controlling the flexible adult toy according to claim 1, wherein the stimulating structure comprises at least one of a vibrating module, a swelling module, a sucking module, a rotating module and a heating module.

15. The method for controlling the flexible adult toy according to claim 1, wherein the communication between the first terminal and the second terminal is established by an instant-messaging application or web browser.

16. The method for controlling the flexible adult toy according to claim 1, further comprising:

detecting, by a sensor disposed in the flexible adult toy, status of the flexible adult toy; and sending detected information to the first terminal.

17. The method for controlling the flexible adult toy according to claim 16, further comprising:

generating, by the first terminal, a simulation image of the flexible adult toy according to the detected information; and sending the simulation image to the second terminal.

* * * * *